(12) United States Patent
Cao

(10) Patent No.: US 9,501,653 B2
(45) Date of Patent: Nov. 22, 2016

(54) METHOD AND APPARATUS OF VERIFYING USABILITY OF BIOLOGICAL CHARACTERISTIC IMAGE

(71) Applicant: Alibaba Group Holding Limited, Grand Cayman (KY)

(72) Inventor: Kai Cao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/684,081

(22) Filed: Apr. 10, 2015

(65) Prior Publication Data

US 2015/0294173 A1    Oct. 15, 2015

(30) Foreign Application Priority Data

Apr. 14, 2014   (CN) ........................ 2014 1 0148019

(51) Int. Cl.
| | |
|---|---|
| G06K 9/00 | (2006.01) |
| G06F 21/60 | (2013.01) |
| H04N 1/32 | (2006.01) |
| G06T 1/00 | (2006.01) |
| G06F 21/32 | (2013.01) |

(52) U.S. Cl.
CPC ............. *G06F 21/60* (2013.01); *G06F 21/32* (2013.01); *G06T 1/0021* (2013.01); *H04N 1/32352* (2013.01)

(58) Field of Classification Search
None
See application file for complete search history.

(56) References Cited

U.S. PATENT DOCUMENTS

| | | | | |
|---|---|---|---|---|
| 6,614,914 | B1 * | 9/2003 | Rhoads | G06F 17/30876 382/100 |
| 6,829,367 | B1 | 12/2004 | Toyokawa et al. | |
| 2003/0225693 | A1 | 12/2003 | Ballard et al. | |
| 2004/0003052 | A1 * | 1/2004 | Yoda | G06T 5/006 709/217 |
| 2004/0052400 | A1 * | 3/2004 | Inomata | G06T 1/0028 382/100 |
| 2004/0111648 | A1 * | 6/2004 | Fujisawa | G07C 9/00087 726/6 |
| 2004/0158724 | A1 * | 8/2004 | Carr | B42D 25/00 713/186 |
| 2004/0243567 | A1 * | 12/2004 | Levy | G06F 17/30032 |
| 2004/0258274 | A1 * | 12/2004 | Brundage | G07D 7/128 382/100 |
| 2005/0010776 | A1 | 1/2005 | Kenen et al. | |
| 2005/0063027 | A1 * | 3/2005 | Durst, Jr. | G06K 7/1417 359/2 |
| 2005/0073725 | A1 * | 4/2005 | Lim | G06T 1/0021 358/3.28 |
| 2005/0091338 | A1 | 4/2005 | de la Huerga | |
| 2006/0165257 | A1 * | 7/2006 | Yamaguchi | H04N 1/32203 382/100 |
| 2006/0200672 | A1 * | 9/2006 | Calhoon | G06F 21/16 713/176 |
| 2007/0016790 | A1 | 1/2007 | Brundage et al. | |
| 2007/0075827 | A1 * | 4/2007 | Itoh | G06F 21/32 340/5.53 |
| 2007/0091376 | A1 * | 4/2007 | Calhoon | G06T 1/0021 358/3.28 |

(Continued)

OTHER PUBLICATIONS

PCT Search Report and Written Opinion mailed Jul. 23, 2015 for PCT Application No. PCT/US15/25428, 9 pages.

*Primary Examiner* — Aaron W Carter
(74) *Attorney, Agent, or Firm* — Lee & Hayes, PLLC

(57) ABSTRACT

A method and an apparatus of verifying a usability of a biological characteristic image are disclosed. The method includes: receiving a biological characteristic image uploaded by a terminal; verifying a digital watermark included in the biological characteristic image; and if verification is passed, determining that the biological characteristic image is usable. The technical solution of the present disclosure can ensure that a biological characteristic image generated in a device can only be used in that device, thus avoiding a security problem which may be caused by the theft and interception of a biological characteristic image of a user when storing or transmitting the image using a biological recognition technology.

20 Claims, 7 Drawing Sheets

(56) References Cited

U.S. PATENT DOCUMENTS

| | | |
|---|---|---|
| 2007/0147669 A1 | 6/2007 | Hamid et al. |
| 2007/0237354 A1* | 10/2007 | Zhou ................. G06K 9/00275 382/100 |
| 2007/0255962 A1 | 11/2007 | Lu et al. |
| 2008/0089554 A1* | 4/2008 | Tabankin ............. G06T 1/0021 382/100 |
| 2008/0128493 A1* | 6/2008 | Jones ....................... B41M 5/24 235/380 |
| 2008/0162943 A1 | 7/2008 | Ali et al. |
| 2008/0191839 A1 | 8/2008 | Sato |
| 2008/0199040 A1* | 8/2008 | Jonsson ............. H04N 1/32149 382/100 |
| 2008/0235808 A1* | 9/2008 | Gutta ...................... G06F 21/10 726/28 |
| 2010/0052852 A1* | 3/2010 | Mohanty ................ B42D 25/00 340/5.83 |
| 2010/0328033 A1 | 12/2010 | Kamei |
| 2012/0297190 A1 | 11/2012 | Shen et al. |
| 2013/0251214 A1 | 9/2013 | Chung |
| 2014/0204237 A1* | 7/2014 | Sohn .................. H04N 5/23219 348/222.1 |
| 2014/0337634 A1* | 11/2014 | Starner ................ H04L 9/3231 713/186 |
| 2015/0003608 A1* | 1/2015 | Ansari ................... H04N 7/147 380/201 |
| 2015/0220717 A1* | 8/2015 | Shin ........................ G06F 21/32 726/28 |

* cited by examiner

METHOD AND APPARATUS OF VERIFYING USABILITY OF BIOLOGICAL CHARACTERISTIC IMAGE

CROSS REFERENCE TO RELATED PATENT APPLICATION

This application claims foreign priority to Chinese Patent Application No. 201410148019.0 filed on Apr. 14, 2014, entitled "Method and Apparatus of Verifying Usability of Biological Characteristic Image", which is hereby incorporated by reference in its entirety.

TECHNICAL FIELD

The present disclosure relates to the field of Internet technology, and in particular, to methods and apparatuses of verifying usability of a biological characteristic image.

BACKGROUND

When performing a recognition of biological characteristics (which include, but are not limited to, biological characteristics such as a finger print, a palm print, an eye print, an iris, a palm vein, or a human face, etc.), existing technologies need to record or transmit a biological characteristic image of a user. In order to prevent a biological characteristic image that is stored locally in a wireless device or transmitted to a server from illegal use and masquerading as an identity of a user using the image by a thief, the existing technologies generally perform an encryption on the biological characteristic image. However, after obtaining an encrypted sample of the biological characteristic image, the thief may perform cracking by brute force via a technical means. Because the biological characteristic of the user cannot be changed, the server cannot report stolen biological characteristic information, and the cracked biological characteristic image may be used by the thief to conduct fraud repeatedly in various scenarios. In addition, a file size of a biological characteristic image is generally large. Repeated encryption and decryption will increase a computation cost of a user device and decrease the user experience.

In view of the above, a solution that performs protection and usability verification of a biological characteristic image is desired.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A goal of the present disclosure is to provide a method and an apparatus of verifying a usability of a biological characteristic image in order to solve a security problem due to stealing and interception of a biological characteristic image of a user when the image is stored or transmitted by a biological recognition technique in the existing technologies.

One aspect of the present disclosure provides a method of verifying a usability of a biological characteristic image, which includes: receiving a biological characteristic image uploaded by a terminal; verifying a digital watermark included in the biological characteristic image; and determining that the biological characteristic image is usable upon successful verification.

Another aspect of the present disclosure further provides an apparatus of verifying a usability of a biological characteristic image, which includes: a receiving module used for receiving a biological characteristic image uploaded by a terminal; a verification module used for verifying a digital watermark included in the biological characteristic image; and a determination module used for determining that the biological characteristic image is usable upon successful verification.

Another aspect of the present disclosure further provides a method of verifying a usability of a biological characteristic image, which includes: acquiring a biological characteristic image that is generated by or stored in a terminal; verifying a digital watermark included in the biological characteristic image; and determining that the biological characteristic image is usable in the terminal upon successful verification.

Another aspect of the present disclosure further provides a terminal of verifying a usability of a biological characteristic image, which includes: an acquisition module used for obtaining a biological characteristic image that is generated by or stored in the terminal; a verification module used for verifying a digital watermark included in the biological characteristic image; and a determination module used for determining that the biological characteristic image is usable in the terminal upon successful verification.

Compared with existing technologies, the technical solution of the present disclosure can ensure that a biological characteristic image generated in a device can be used on that device only, thereby preventing a security problem due to stealing or interception of a personal biological characteristic image of a user when the image is stored or transmitted by a biological recognition technique. Even if the biological characteristic image is acquired illegally, the acquirer still cannot masquerade as an identity of the user using the image to perform an authorization or authentication fraud in a server.

BRIEF DESCRIPTION OF THE DRAWINGS

The accompanying drawings described herein provide further understanding of the present disclosure and are construed as a part of the present disclosure. Exemplary embodiments of the present disclosure and descriptions thereof are used to explain the present disclosure, and do not impose any improper limitations to the present disclosure. In the drawings.

DETAILED DESCRIPTION

The main idea of the present disclosure lies in that: when a user biological characteristic (or biometric) image is collected and generated, after a digital watermark is embedded into a raw biological characteristic image using a digital watermark technology, an acquired biological characteristic image including the digital watermark is locally stored in a terminal or uploaded to a server for storage, and the terminal or the server may determine whether the biological characteristic image is usable by verifying the digital watermark included in the biological characteristic image, in order to avoid a security problem which may be caused by stealing or interception of the biological characteristic image when the image is stored or transmitted.

In order to make the objectives, technical solutions and advantages of the present disclosure more clearly, the technical solutions of the present disclosure are described clearly and completely through specific embodiments and corresponding accompanying drawings of the present disclosure. Apparently, the described embodiments are merely a part and not all of embodiments of the present disclosure. Based on the embodiments in the present disclosure, all other embodiments obtained by one of ordinary skill in the art without making any creative efforts shall belong to the scope of protection of the present disclosure.

According to an embodiment of the present disclosure, a method of verifying a usability of a biological characteristic image is provided.

Figure 1:
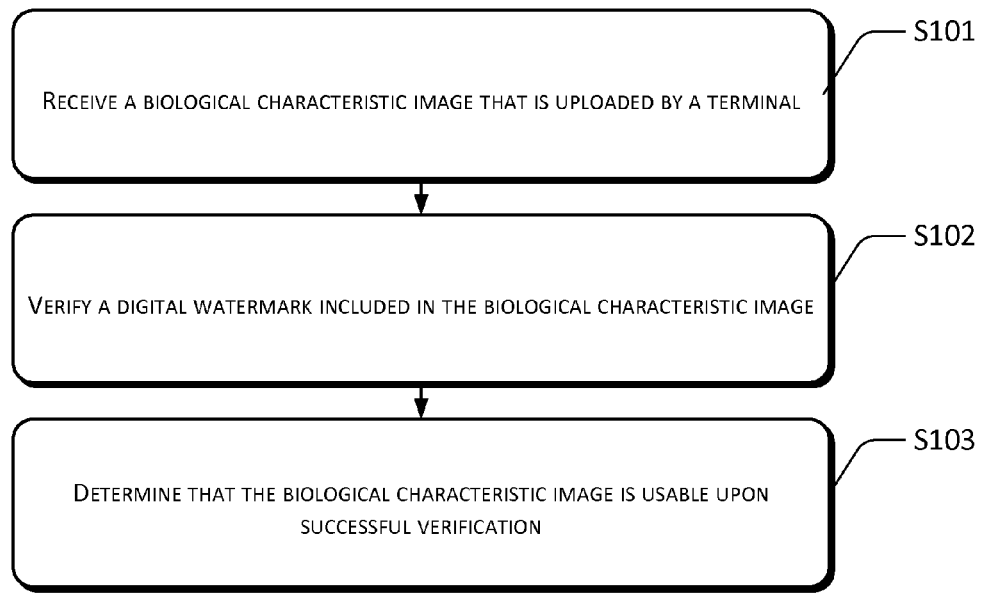
FIG. 1 is a flowchart of a method of verifying a usability of a biological characteristic image according to an embodiment of the present disclosure.

Referring to FIG. 1, FIG. 1 is a flowchart of a method of verifying a usability of a biological characteristic image according to an embodiment of the present disclosure. The method may be applicable to: when a user uses a biometric authentication product (for example, an application having a biometric verification function or providing a biometric verification service) and uploads a biological characteristic image that is used for performing a biometric verification to a server for verifying a usability of the biological characteristic image in the server. For example, when using a biological characteristic for verification, a user generally desires to upload and store an image of the biological characteristic in a server in order to facilitate different terminal devices (for example, a mobile terminal such as a mobile phone or a tablet computer, etc.) to perform operations such as identity verification and authentication using the image of the biological characteristic stored in the server. When performing a biometric verification, operations, such as characteristic extraction and comparison, etc., may be performed on a user biological characteristic image stored at the server and a biological characteristic (such as a finger print, a human face, etc.) of a user collected in real time to verify an identity of the user.

As shown in FIG. 1, a biological characteristic image that is uploaded by a terminal is received at S101. The biological characteristic image may include a digital watermark. Prior to uploading the biological characteristic image, the terminal may embed a digital watermark into an original biological characteristic image of a user that is collected to generate a biological characteristic image including the digital watermark.

According to an embodiment of the present disclosure, the digital watermark may be embedded into the biological characteristic image of the user collected by the terminal using a digital watermark embedded algorithm to generate the biological characteristic image including the digital watermark. A digital watermark to be embedded may be generated based on device identification information and/or user identification information of the terminal.

Figure 2:
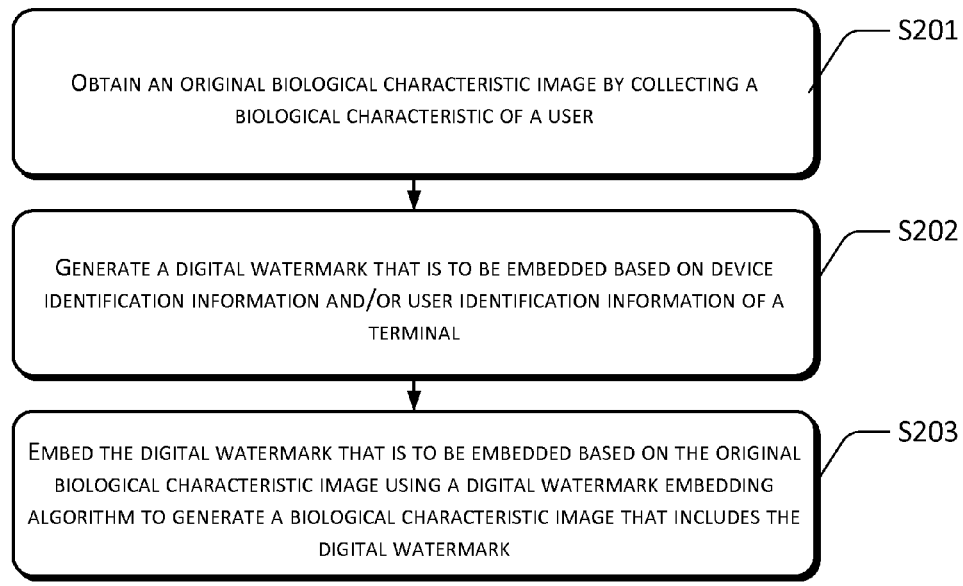
FIG. 2 is a flowchart of generating a biological characteristic image including a digital watermark according to an embodiment of the present disclosure.

In order to describe a process of generating a biological characteristic image including a digital watermark in more detail, FIG. 2 may be referenced for detailed description. Referring to FIG. 2, FIG. 2 is a flowchart illustrating a procedure of generating a biological characteristic image that includes a digital watermark according to an embodiment of the present disclosure.

Generation of a biological characteristic image that includes a digital watermark may include the following method blocks:

Block S201 obtains an original biological characteristic image through collection of a biological characteristic of a user by a terminal. Specifically, the biological characteristic of the user is collected via a collection device (for example, a camera) of the terminal. The collected biological characteristic may include, but is not limited to, a finger print, a palm print, an eye print, an iris, a palm vein, a human face, and the like.

Block S202 generates a digital watermark that is to be embedded based on device identification information and/or user identification information of the terminal.

The device identification information may be generated by performing a computation on device information of the terminal using a particular Hash encryption algorithm (for example, Secure Hash Algorithm SHA-2). The device information of the terminal may include, but is not limited to, any one or more of a Mobile Equipment Identity (IMEI), device/processor type information, operating system version information, and a mobile subscriber identification number (IMSI) of the terminal. The device identification information of the terminal may be generated by the server which obtains the device information uploaded by the user, performs a Hash encryption algorithm on the device information, delivers the information to the terminal, and stores the information therein. Alternatively, the device identification information of the terminal may be generated by the terminal which performs a particular Hash encryption algorithm on the device information, and then uploads the information to the server for storage. The user identification information may be account information of the user of the terminal, for example, account information (or referred to as a member ID) that is registered and stored in the server when the user of the terminal uses an application (for example, a client application) that provides a biometric verification service.

According to an embodiment of the present disclosure, the device identification information and/or the user identification information of the terminal may be directly used as digital watermark information that is to be embedded. A digital watermark embedding algorithm is used to embed the device identification information and/or the user identification information of the terminal into the original biological characteristic image. In order to improve the security, a specific processing may be performed on the device identification information and/or the user identification information of the terminal to acquire the digital watermark that is to be embedded. For example, transformation or processing such as randomization, chaotization, frequency spread, and encryption may be performed on the device identification information and/or the user identification information of the terminal, and data acquired after the transformation or processing (such as a randomized sequence, a character, or an image, etc.) is used as the digital watermark to be embedded.

Block S203 embeds the digital watermark that is to be embedded into the original biological characteristic image using a digital watermark embedding algorithm to generate a biological characteristic image that includes the digital watermark.

The used digital watermark embedding algorithm may include: a spatial domain algorithm, a transform domain algorithm, a compressed domain algorithm, or an NEC algorithm. In an embodiment, the present disclosure uses the NEC algorithm to embed the digital watermark into the original biological characteristic image to acquire a biological characteristic image that includes the digital watermark. The device identification information and/or the user identification information of the terminal may be used as a secret key for generating a pseudorandom sequence in the NEC algorithm.

The process of generating a biological characteristic image including a digital watermark is described above with reference to FIG. 2. Back to FIG. 1, verification is performed for the digital watermark that is included in the biological characteristic image at S102.

According to an embodiment of the present disclosure, the verification may be performed for the digital watermark that is included in the biological characteristic based on the device identification information and/or the user identification information of the terminal.

Figure 3:
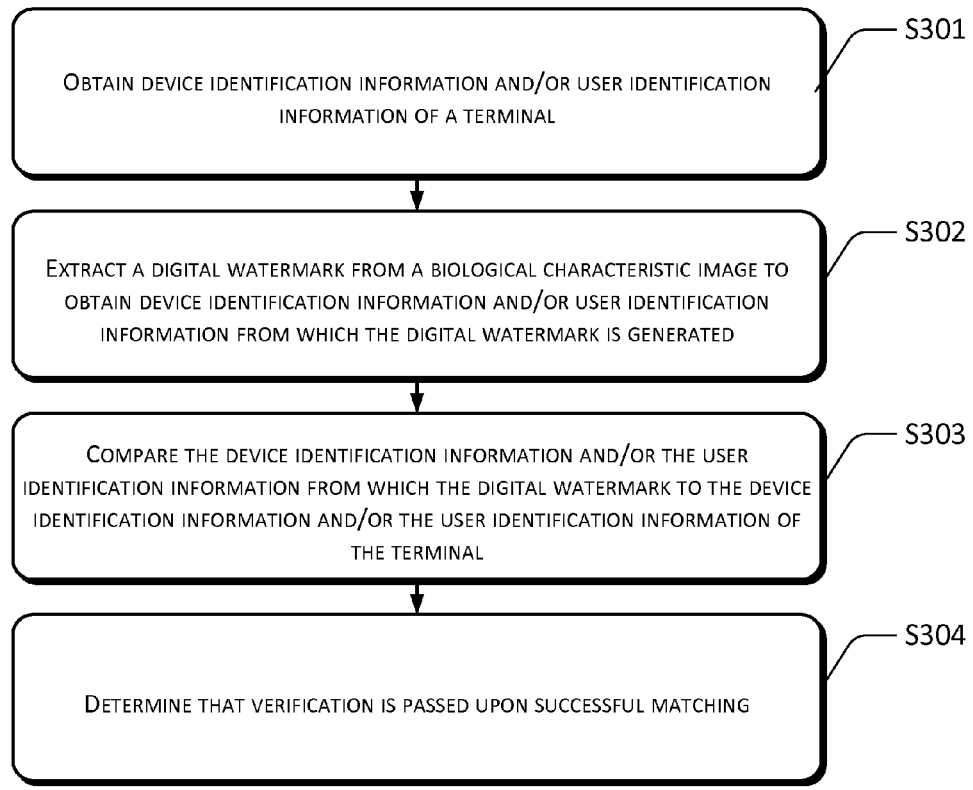
FIG. 3 is a flowchart of verifying a digital watermark included in a biological characteristic image according to an embodiment of the present disclosure.

In order to describe the process of verification in more detail, a detailed description of the process of verification may be made with reference to FIG. 3. FIG. 3 is a flowchart illustrating a procedure of performing verification for a digital watermark included in a biological characteristic image according to an embodiment of the present disclosure.

At S301, the device identification information and/or the user identification information of the terminal is obtained.

Specifically, when uploading the biological characteristic image, the terminal may further upload the device identification information and/or the user identification information of the terminal at the same time. Alternatively, after receiving the biological characteristic image uploaded by the terminal, the server may search for device identification information that corresponds to the user identification information and is stored in the server based on the user identification information (user account information) of the terminal.

At S302, the digital watermark is extracted from the biological characteristic image to acquire the device identification information and/or the user identification information from which the digital watermark is generated.

As described above, the digital watermark that is included in the biological characteristic image is generated based on the device identification information and/or the user identification information of the terminal, and is embedded into the original biological characteristic image using the digital watermark embedding algorithm. Therefore, the digital watermark may be extracted from the biological characteristic image using a digital watermark extraction algorithm (which is generally an inverse process of the digital watermark embedding algorithm), and the device identification information and/or user identification information used for generating the digital watermark is acquired from the extracted digital watermark.

At S303, the device identification information and/or the user identification information that is used for generating the digital watermark is compared with the device identification information and/or the user identification information of the terminal.

Specifically, a comparison is made as to whether the device identification information and/or user identification information that is used for generating the digital watermark and the device identification information and/or the user identification information of the terminal are identical. If identical, a determination may be made that the device identification information and/or user identification information that is used for generating the digital watermark matches with the device identification information and/or the user identification information of the terminal.

At S304, if matched, a determination is made that the verification is passed.

If the device identification information and/or user identification information that is used for generating the digital watermark is identical with the device identification information and/or the user identification information of the terminal, this indicates that the biological characteristic image is generated by using the device identification information and the user identification information of the terminal which uploads the biological characteristic image, and a determination may be made that the verification is passed.

The process of verification is described above with reference to FIG. 3. Back to FIG. 1, a determination is made that the biological characteristic image is usable upon successful verification at S103.

Specifically, if the verification is passed, this indicates that the biological characteristic image is generated by using the device identification information and/or the user identification information of the terminal which uploads the biological characteristic image. In other words, the biological characteristic image uploaded by the terminal has a reliable source, and may be used as a sample for performing a biometric verification. For example, characteristic extraction is performed on the biological characteristic image to generate a characteristic template for performing an identity verification of the user, etc. If the verification fails, i.e., the biological characteristic image is not generated by using the device identification information and/or the user identification information of the terminal which uploads the biological characteristic image, this indicates that the biological characteristic image may be acquired by the terminal via other unauthorized methods, and thus storage or further processing of the biological characteristic image will be rejected.

According to an embodiment of the present disclosure, before performing verification for a digital watermark, a detection of whether a digital watermark exists in the biological characteristic image may further be included, in which a digital watermark detection algorithm may be used to detect whether a digital watermark exists in the received biological characteristic image. If a digital watermark exists in the biological characteristic image, the method block of watermark extraction and verification (i.e., S102 in FIG. 1) is performed. If no digital watermark exists in the biological characteristic image, a determination is made that the biological characteristic image is not usable.

According to an embodiment of the present disclosure, when the terminal of the user which stores his/her biological characteristic image is lost, or when the user or the server suspects that a biological characteristic image stored or used by the user at a certain terminal has the possibility of being intercepted or stolen, such biological characteristic image may be reported as being lost in the server, for example, the device identification information of the terminal may be added into a blacklist in the server.

The present disclosure further provides an apparatus of verifying a usability of a biological characteristic image.

Figure 4:
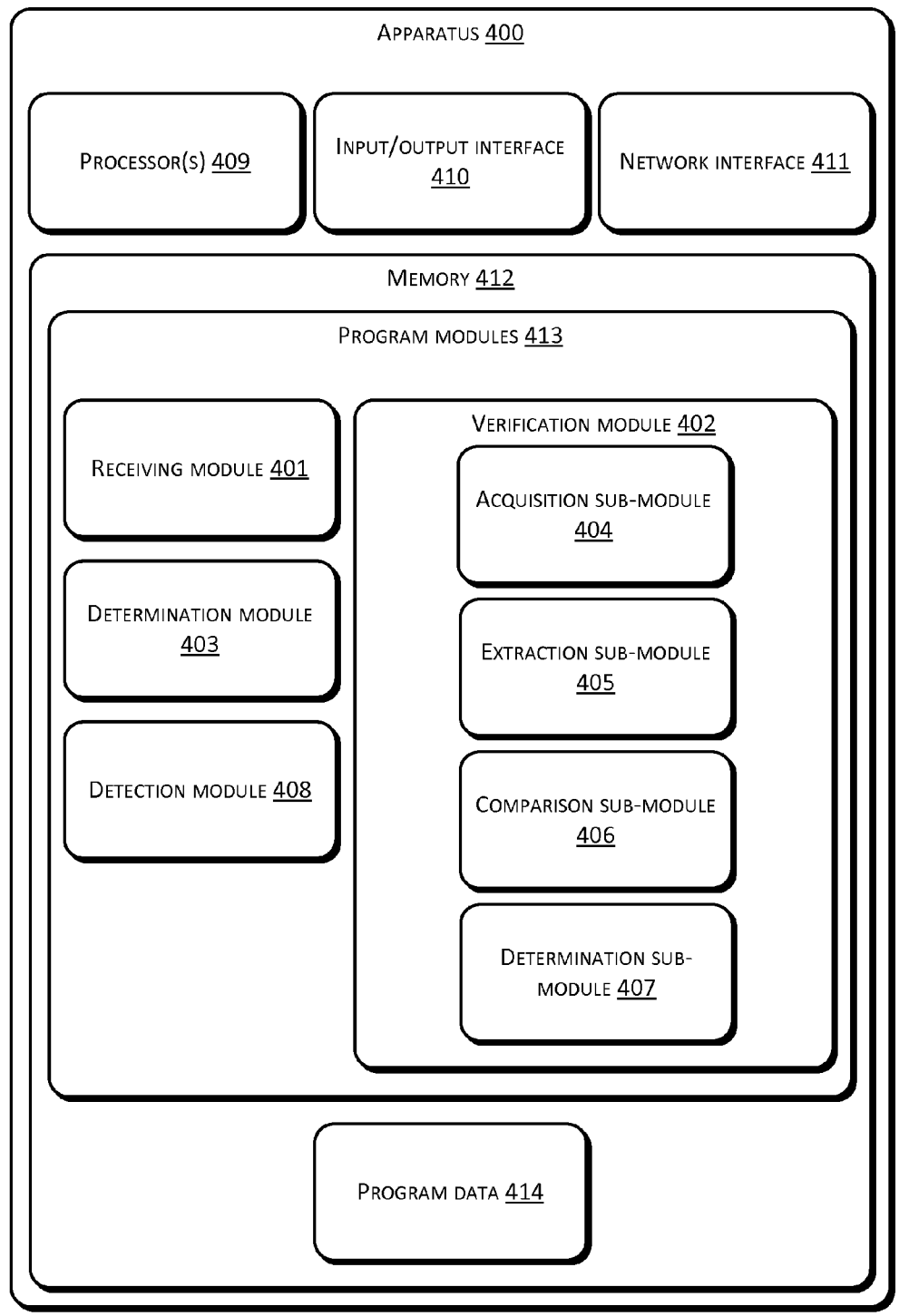
FIG. 4 is a structural diagram of an apparatus of verifying a usability of a biological characteristic image according to an embodiment of the present disclosure.

FIG. 4 schematically shows a structural diagram of an apparatus of verifying a usability of a biological characteristic image according to an embodiment of the present disclosure. According to an embodiment of the present disclosure, the apparatus 400 includes: a receiving module 401, a verification module 402 and a determination module 403.

The receiving module 401 may be used for receiving a biological characteristic image that is uploaded by a terminal.

The verification module 402 may be used for verifying a digital watermark included in the biological characteristic image.

The determination module 403 may be used for determining that the biological characteristic image is usable upon successful verification.

According to an embodiment of the present disclosure, the digital watermark may be generated based on device identification information and/or user identification information of the terminal.

The device identification information is generated based on the device information of the terminal using a Hash algorithm. The device information of the terminal includes: any one or more of a Mobile Equipment Identity, a device/processor model number, operating system version information, and a mobile subscriber identity of the terminal.

According to the embodiment of the present disclosure, the verification module 402 may further be used for verifying the digital watermark included in the biological characteristic image based on the device identification information and/or the user identification information of the terminal.

The verification module 402 may further include: an acquisition sub-module 404, an extraction sub-module 405, a comparison sub-module 406 and a determination sub-module 407.

The acquisition sub-module 404 may be used for obtaining the device identification information and/or the user identification information of the terminal.

The extraction sub-module 405 may be used for extracting the digital watermark from the biological characteristic image to acquire the device identification information and/or user identification information that is used for generating the digital watermark.

The comparison sub-module 406 may be used for comparing the device identification information and/or user identification information that is used for generating the digital watermark with the device identification information and/or the user identification information of the terminal.

The determination sub-module 407 may be used for determining that the verification is passed upon successful matching.

According to the embodiment of the present disclosure, the apparatus 400 may further include: a detection module 408. The detection module 408 may be used for examining whether a digital watermark exists in the biological characteristic image. The determination module may further be used for determining that the biological characteristic image is not usable if no digital watermark exists in the biological characteristic image.

Furthermore, the apparatus 400 may be implemented as one or more computing devices, which may include one or more processors (CPU) 409, an input/output interface 410, a network interface 411, and memory 412.

The memory 412 may include a form of a computer readable media such as volatile memory, random access memory (RAM) and/or non-volatile memory, such as read-only memory (ROM) or flash RAM. The memory 412 is an example of a computer readable media.

The computer readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 412 may include program module 413 and program data 414. The foregoing modules and/or sub-modules may be included in the memory 412, e.g., program module 413. Details of these modules and sub-modules may be found in the foregoing description and are therefore not redundantly described herein.

As functions implemented by the apparatus of this embodiment basically correspond to the method embodiments as shown in FIGS. 1-3, and therefore, those not described in detail in this embodiment may be referenced to related descriptions in the above embodiments, and are not redundantly described herein.

In another aspect, the present disclosure further provides a method of verifying a usability of a biological characteristic image. The method may be applicable to verification of the usability of a biological characteristic image, i.e., ensuring that the biological characteristic image may be used only in a terminal which generates the image when a user uses a biometric authentication product (for example, an application having a biometric verification function or providing a biometric verification service), when the terminal generates and stores the biological characteristic image for performing a biometric verification of the user, or when the biological characteristic image stored in the terminal is used for performing a biometric verification of the user.

Figure 5:
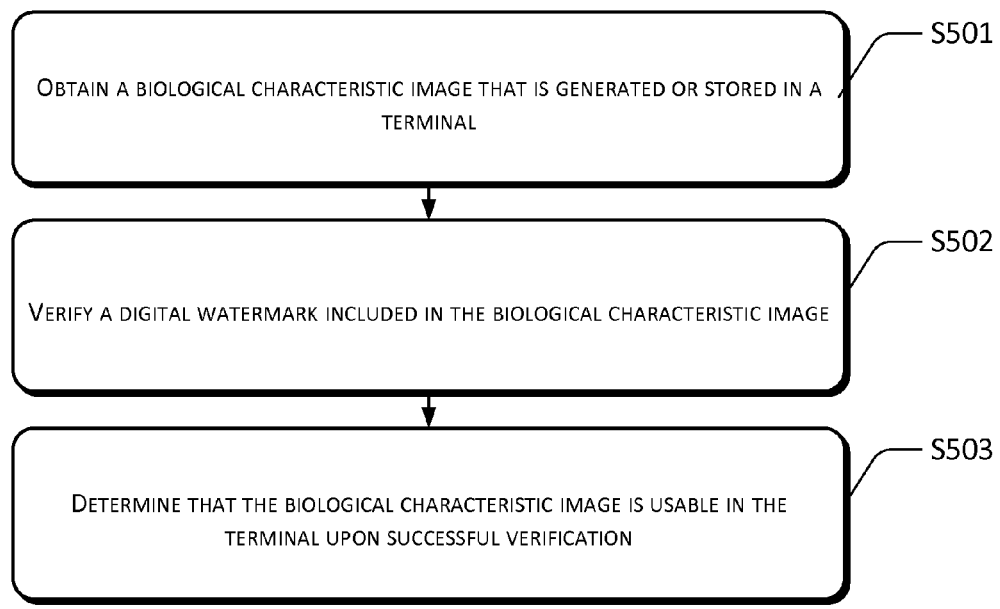
FIG. 5 is a flowchart of a method of verifying a usability of a biological characteristic image according to another aspect of the present disclosure.

As shown in FIG. 5, FIG. 5 is a flowchart of a method of verifying a usability of a biological characteristic image according to another aspect of the present disclosure.

At S501, a biological characteristic image generated by or stored in a terminal is obtained. The biological characteristic image includes a digital watermark. When a biological characteristic image of a user is collected by a terminal and before the biological characteristic image is stored, a digital watermark may be embedded in this original biological characteristic image of the user that is collected to generate a biological characteristic image including the digital watermark. The digital watermark may be generated based on device identification information and/or user identification information of the terminal.

According to an embodiment of the present disclosure, a digital watermark may be embedded into the biological characteristic image of the user collected by the terminal by using a digital watermark embedding algorithm to generate the biological characteristic image that includes the digital watermark. The digital watermark to be embedded may be generated based on device identification information and/or user identification information of the terminal. The digital watermark is embedded into the original biological characteristic image using a digital watermark embedding algorithm. The device identification information may be generated based on device information of the terminal using a Hash algorithm. The device information of the terminal includes: any one or more of a Mobile Equipment Identity, a device/processor type, operating system version information, and a mobile subscriber identity of the terminal. The user identification information may be account information of the user of the terminal, for example, account information (or referred to as a member ID) that is registered and stored in a server when the user of the terminal uses an application (for example, a client application) that provides a biometric verification service.

Method blocks of generating the biological characteristic image including the digital watermark may be referenced to method blocks S201-S203 as shown in FIG. 2, and are not redundantly described herein.

At S502, verification is performed for the digital watermark included in the biological characteristic image.

According to an embodiment of the present disclosure, verification may be performed for the digital watermark included in the biological characteristic image based on the device identification information and/or the user identification information of the terminal.

Figure 6:
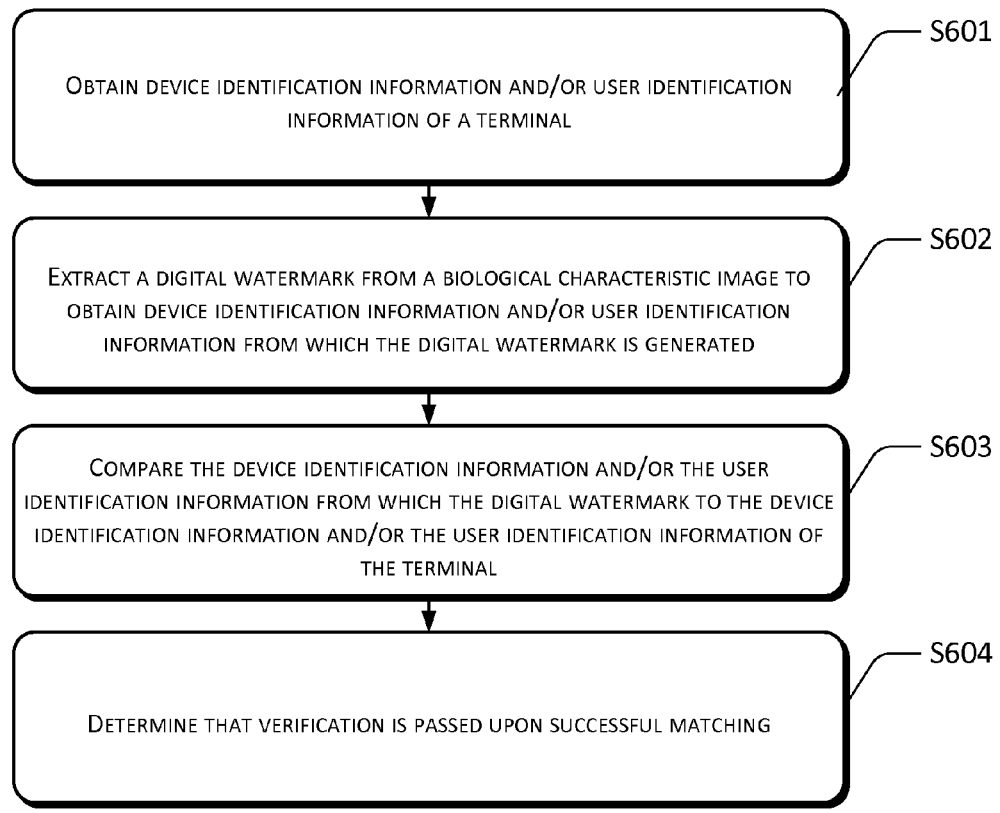
FIG. 6 is a flowchart of verifying a digital watermark included in a biological characteristic image according to an embodiment of another aspect of the present disclosure.

In order to describe a process of verification in more detail, detailed descriptions may be made with reference to FIG. 6. FIG. 6 is a flowchart illustrating a procedure of performing verification for a digital watermark included in a biological characteristic image according to an embodiment of the present disclosure.

At S601, device identification information and/or user identification information of the terminal is obtained.

As described above (i.e., at S202), the device identification information used for generating the digital watermark may be generated by performing a computation on the device information of the terminal using a specific Hash encryption algorithm. Therefore, when the device identification information of the terminal is acquired, the device information of the terminal may be acquired first, and a computation may be made to the acquired device information using that specific Hash encryption algorithm to generate the device identification information of the terminal. Alternatively, the device information of the terminal may be acquired and uploaded to a server. The server performs a computation on the device information of the terminal using the specific Hash algorithm to generate the device identification information of the terminal, and the device identification information of the terminal returned by the server is acquired. Moreover, the user identification information (for example, a member ID) that is inputted by the user of the terminal or that is pre-stored in the terminal may be acquired directly from the terminal.

Alternatively, the device identification information and/or the user identification information of the terminal that is stored in the terminal may further be acquired directly.

At S602, the digital watermark is extracted from the biological characteristic image to obtain the device identification information and/or user identification information from which the digital watermark is generated.

The digital watermark included in the biological characteristic image is generated based on the device identification information and/or the user identification information of the terminal, and is embedded into the original biological characteristic image using the digital watermark embedding algorithm. Therefore, the digital watermark may be extracted from the biological characteristic image using a digital watermark extraction algorithm, and the device identification information and/or user identification information via which the digital watermark is generated is acquired from the extracted digital watermark.

At S603, the device identification information and/or user identification information via which the digital watermark is generated is compared with the device identification information and/or the user identification information of the terminal.

Specifically, a comparison may be made as to whether the device identification information and/or user identification information via which the digital watermark is generated and the device identification information of the terminal and/or the user identification information of the terminal are identical. If affirmative, a determination may be made that the device identification information and/or user identification information via which the digital watermark is generated matches with the device identification information and/or the user identification information of the terminal.

At S604, a determination is made that the verification is passed upon successful matching.

If the device identification information and/or user identification information via which the digital watermark is generated is identical with the device identification information and/or the user identification information of the terminal, this indicates that the biological characteristic image is generated using the device identification information and the user identification information of the terminal, and thus a determination may be made that the verification is passed. If the device identification information and/or user identification information via which the digital watermark is generated does not match with the device identification information and/or the user identification information of the terminal, a determination may be made that the verification fails.

The verification process is described above with reference to FIG. 6. Back to FIG. 5, a determination is made that the biological characteristic image is usable in the terminal if the verification is successful at S503.

Specifically, if the verification is successful, this indicates that the biological characteristic image is generated by using the device identification information and/or the user identification information of the terminal. A determination may be made that the biological characteristic image may be used in the terminal as a sample for performing a biometric verification. For example, characteristic extraction is performed on the biological characteristic image to generate a characteristic template for performing an identity verification of the user. If the verification fails, i.e., the biological characteristic image is not generated by using the device identification information and/or the user identification information of the terminal, this indicates that the biological characteristic image may be acquired via other unauthorized means, and the use of the biological characteristic image in the terminal will be rejected. In this way, thereby ensuring that the biological characteristic image can only be used in the terminal which generates the image for performing an identity verification of the user, and is not usable in other terminals. Even if the biological characteristic image is acquired through an illegal means, an acquirer still cannot masquerade an identity of the user or perform real-time authorization or authentication fraud in the server using the biological characteristic image.

According to an embodiment of the present disclosure, before S502 is performed, a method block of detecting whether a digital watermark exists in the biological characteristic image may further be included. A digital watermark detection algorithm may be used to detect whether a digital watermark exists in the received biological characteristic image. If a digital watermark exists in the biological characteristic image, S502 is performed for extracting and verifying the digital watermark. If no digital watermark exists in the biological characteristic image, a determination is made that the biological characteristic image is unusable in the terminal.

Another aspect of the present disclosure further provides a terminal of verifying a usability of a biological characteristic image.

Figure 7:
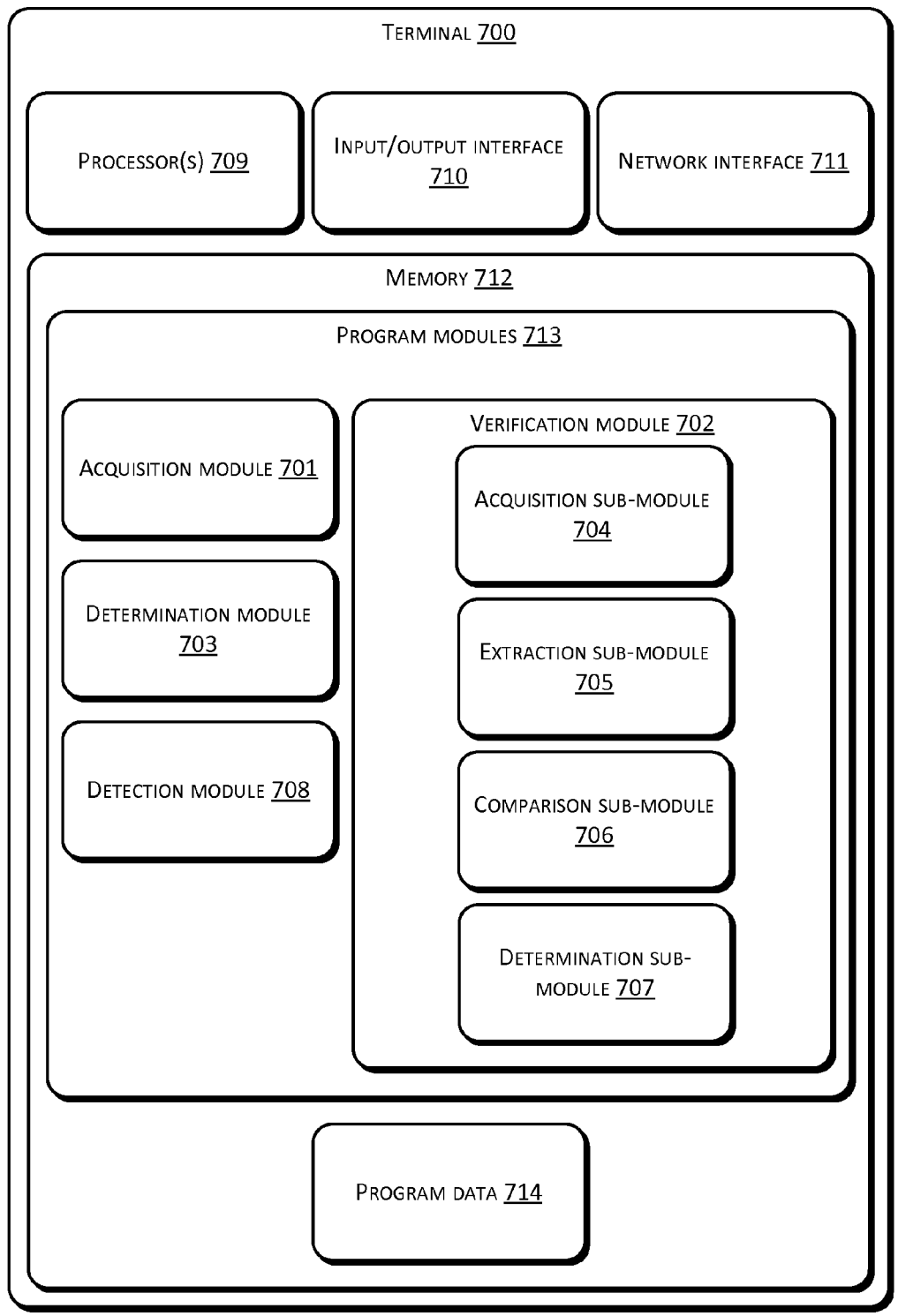
FIG. 7 is a structural diagram of a terminal of verifying a usability of a biological characteristic image according to another aspect of the present disclosure.

FIG. 7 schematically shows a structural diagram of a terminal of verifying a usability of a biological characteristic image according to an embodiment of the present disclosure. The terminal 700 includes: an acquisition module 701, a verification module 702, and a determination module 703.

The acquisition module 701 may be used for acquiring a biological characteristic image generated by or stored in the terminal.

The verification module 702 may be used for verifying a digital watermark included in the biological characteristic image.

The determination module 703 may be used for determining that the biological characteristic image is usable in the terminal upon successful verification.

According to an embodiment of the present disclosure, the digital watermark may be generated based on device identification information and/or user identification information of the terminal.

The device identification information is generated based on the device information of the terminal using a Hash algorithm. The device information of the terminal includes: any one or more of a Mobile Equipment Identity, a device/processor type, operating system version information and a mobile subscriber identity of the terminal.

According to the embodiment of the present disclosure, the verification module 702 may be further used for verifying the digital watermark included in the biological characteristic image based on the device identification information and/or the user identification information of the terminal.

The verification module 702 may further include: an acquisition sub-module 704, an extraction sub-module 705, a comparison sub-module 706, and a determination sub-module 707.

The acquisition sub-module 704 may be used for acquiring the device identification information and/or the user identification information of the terminal.

The extraction sub-module 705 may be used for extracting the digital watermark from the biological characteristic image to acquire the device identification information and/or the user identification information from which the digital watermark is generated.

The comparison sub-module 706 may be used for comparing the device identification information and/or the user identification information from which the digital watermark is generated with the device identification information and/or the user identification information of the terminal.

The determination sub-module 707 may be used for determining that the verification is passed upon successful matching.

According to the embodiment of the present disclosure, the terminal 700 may further include: a detection module 708. The detection module 708 may be used for detecting whether a digital watermark exists in the biological characteristic image. The determination module may be further be used for determining that the biological characteristic image is not usable in the terminal if no digital watermark exists in the biological characteristic image.

In an embodiment, the terminal 700 may be implemented as one or more computing devices, which may include one or more processors (CPU) 709, an input/output interface 710, a network interface 711, and memory 712.

The memory 712 may include a form of a computer readable media such as volatile memory, random access memory (RAM) and/or non-volatile memory, such as read-only memory (ROM) or flash RAM. The memory 412 is an example of a computer readable media.

The memory 712 may include program module 713 and program data 714. The foregoing modules and/or sub-modules may be included in the memory 712, e.g., program module 713. Details of these modules and sub-modules may be found in the foregoing description and are therefore not redundantly described herein.

Functions implemented by the terminal of this embodiment basically correspond to the method embodiments shown in FIGS. 5-6. Therefore, those not described in detail in the description of this embodiment may be referenced to the related descriptions in the foregoing embodiments, and are not redundantly described herein.

It should be further noted that, terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an . . . " does not exclude any other similar elements from existing in the process, method, product or apparatus.

One skilled in the art should understand that the embodiments of the present disclosure may be provided as a method, a system or a computer program product. Therefore, the present disclosure may be implemented as a completely hardware embodiment, a completely software embodiment, or an embodiment which is a combination of software and hardware. Moreover, the present disclosure may be in a form of a computer program product implemented in one or more computer usable storage media (including, but not limited to, a magnetic disk storage device, a CD-ROM, an optical storage device, and the like) including computer usable program codes.

The above descriptions are merely exemplary embodiments of the present disclosure, and are not intended to limit the present disclosure. For one skilled in the art, the present disclosure may have various modifications and variations. Any modifications, equivalent replacements, improvements or the like made without departing from the spirit and principle of the present disclosure shall be included in the claim scope of the present disclosure.

The invention claimed is:

1. A method implemented by one or more computing devices, the method comprising:
 receiving a biological characteristic image uploaded by a terminal;
 verifying a digital watermark included in the biological characteristic image, the digital watermark being generated based on device identification information and/or user identification information of the terminal; and
 determining whether the biological characteristic image is usable based at least in part on a result of the verifying, the biological characteristic image being usable in the terminal only when the terminal corresponds to a device from which the biological characteristic image is generated.

2. The method of claim 1, wherein the device identification information is generated based on device information of the terminal using a Hash algorithm.

3. The method of claim 2, wherein the device information of the terminal comprises one or more of: a Mobile Equipment Identity, a device/processor type, operating system version information, or a mobile subscriber identification number of the terminal.

4. The method of claim 1, wherein verifying the digital watermark further comprises verifying the digital watermark included in the biological characteristic image based on the device identification information and/or the user identification information of the terminal.

5. The method of claim 1, wherein verifying the digital watermark further comprises:
 acquiring the device identification information and/or the user identification information of the terminal;
 extracting the digital watermark from the biological characteristic image to acquire device identification information and/or user identification information via which the digital watermark is generated; and
 comparing the device identification information and/or the user identification information via which the digital watermark is generated with the device identification information and/or the user identification information of the terminal.

6. The method of claim 5, further comprising determining that the biological characteristic image is usable in response to successful matching between the device identification information and/or the user identification information via which the digital watermark is generated and the device identification information and/or the user identification information of the terminal.

7. The method of claim 1, further comprising determining whether the digital watermark exists in the biological characteristic image prior to verifying the digital watermark included in the biological characteristic image.

8. The method of claim 7, further comprising determining that the biological characteristic image is unusable in response to determining that no digital watermark exists in the biological characteristic image.

9. One or more computer-readable media storing executable instructions that, when executed by one or more processors, cause the one or more processors to perform acts comprising:
 acquiring a biological characteristic image that is generated by or stored in a terminal;
 verifying a digital watermark included in the biological characteristic image, the digital watermark being generated based on device identification information and/or user identification information of the terminal; and
 determining whether the biological characteristic image is usable based at least in part on a result of the verifying, the biological characteristic image being usable in the terminal only when the terminal corresponds to a device from which the biological characteristic image is generated.

10. The one or more computer-readable media of claim 9, wherein the device identification information is generated based on device information of the terminal using a Hash algorithm.

11. The one or more computer-readable media of claim 10, wherein the device information of the terminal comprises one or more of: a Mobile Equipment Identity, a device/processor type, operating system version information, or a mobile subscriber identification number of the terminal.

12. The one or more computer-readable media of claim 9, wherein verifying the digital watermark further comprises verifying the digital watermark included in the biological characteristic image based on the device identification information and/or the user identification information of the terminal.

13. The one or more computer-readable media of claim 9, wherein verifying the digital watermark further comprises:
 acquiring the device identification information and/or the user identification information of the terminal;
 extracting the digital watermark from the biological characteristic image to acquire device identification information and/or user identification information from which the digital watermark is generated; and
 comparing the device identification information and/or the user identification information from which the digital watermark is generated with the device identification information and/or the user identification information of the terminal.

14. The one or more computer-readable media of claim 13, the acts further comprising determining that the biological characteristic image is usable in response to successful matching between the device identification information and/or the user identification information via which the digital watermark is generated and the device identification information and/or the user identification information of the terminal.

15. The one or more computer-readable media of claim 9, the act further comprising determining whether the digital watermark exists in the biological characteristic image prior to verifying the digital watermark included in the biological characteristic image.

16. The one or more computer-readable media of claim 15, the act further comprising determining that the biological characteristic image is unusable in the terminal in response to determining that no digital watermark exists in the biological characteristic image.

17. An apparatus comprising:
 one or more processors;
 memory;
 a receiving module stored in the memory and executable by the one or more processors to receive a biological characteristic image uploaded by a terminal;
 a verification module stored in the memory and executable by the one or more processors to verify a digital watermark included in the biological characteristic image, the digital watermark being generated based on device identification information and/or user identification information of the terminal; and
 a determination module stored in the memory and executable by the one or more processors to determine whether the biological characteristic image is usable based at least in part on a verification result obtained by the verification module, the biological characteristic image being usable in the terminal only when the terminal corresponds to a device from which the biological characteristic image is generated.

18. The apparatus of claim 17, further comprising a detection module stored in the memory and executable by the one or more processors that detects whether the digital watermark exists in the biological characteristic image, and the determination module is further configured to determine that the biological characteristic image is unusable when the detection module detects that no digital watermark exists in the biological characteristic image.

19. The apparatus of claim 17, wherein the verification module comprises:

an acquisition sub-module stored in the memory and executable by the one or more processors to obtain the device identification information and/or the user identification information of the terminal;

an extraction sub-module stored in the memory and executable by the one or more processors to extract the digital watermark from the biological characteristic image to acquire the device identification information and/or the user identification information that is used for generating the digital watermark; and a comparison sub-module stored in the memory and executable by the one or more processors to compare the device identification information and/or the user identification information that is used for generating the digital watermark with the device identification information and/or the user identification information of the terminal.

20. The apparatus of claim 17, wherein the device identification information is generated based at least in part on device information of the terminal, the device information of the terminal comprising one or more of: a Mobile Equipment Identity, a device/processor type, operating system version information, or a mobile subscriber identification number of the terminal.

* * * * *